(12) United States Patent
Raman

(10) Patent No.: US 12,177,754 B2
(45) Date of Patent: *Dec. 24, 2024

(54) LTE GATEWAYS FOR HOME AND COMMERCIAL SENSOR DATA

(71) Applicant: AT&T Mobility II LLC, Atlanta, GA (US)

(72) Inventor: Kaveri Raman, Matawan, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/396,812

(22) Filed: Aug. 9, 2021

(65) Prior Publication Data

US 2021/0368315 A1  Nov. 25, 2021

Related U.S. Application Data

(63) Continuation of application No. 15/228,636, filed on Aug. 4, 2016, now Pat. No. 11,115,793.

(51) Int. Cl.
*H04W 4/70* (2018.01)
*H04L 67/1097* (2022.01)
(Continued)

(52) U.S. Cl.
CPC ............. *H04W 4/70* (2018.02); *H04W 12/08* (2013.01); *H04L 67/1097* (2013.01); *H04W 40/02* (2013.01); *H04W 84/045* (2013.01)

(58) Field of Classification Search
CPC ....... H04W 4/70; H04W 12/08; H04W 40/02; H04W 84/045; H04L 67/1097; Y02D 30/70
See application file for complete search history.

(56) References Cited

U.S. PATENT DOCUMENTS 8,619,582 B2  12/2013  Wang et al.
9,125,003 B2   9/2015  Ma et al.
(Continued)

FOREIGN PATENT DOCUMENTS

WO    WO-2014059599 A1 *  4/2014 ......... H04L 12/1407

OTHER PUBLICATIONS

Condoluci "Towards 5G Dense Nets: Architectural Advances For Effective Machine-Type Communications over Femtocells", IEEE Jan (Year: 2015).*

(Continued)

*Primary Examiner* — Derrick W Ferris
*Assistant Examiner* — Chuong M Nguyen
(74) *Attorney, Agent, or Firm* — Guntin & Gust, PLC; Mark Wilinski

(57) ABSTRACT

Aspects of the subject disclosure may include, for example, a device that receives data from a machine-type communication (MTC) device located at a premises, determines an identifier for the MTC device; compares the identifier with a list of identifiers; and, responsive to determining that the MTC device is a listed device, transmits the data to a first network element remote from the premises. The device and the first network element do not receive data from devices at the premises generating human traffic communications (HTC). The first network element transmits the data to a second network element for aggregation and subsequent transmission to a cloud data facility comprising cloud storage. A data path from the device to the first network element, from the first network element to the second network element, and from the second network element to the cloud data facility forms a secure data path. Other embodiments are disclosed.

20 Claims, 9 Drawing Sheets

(51) Int. Cl.
*H04W 12/08* (2021.01)
*H04W 40/02* (2009.01)
*H04W 84/04* (2009.01)

(56) References Cited

U.S. PATENT DOCUMENTS

| | | | |
|---|---|---|---|
| 9,155,105 B2 | 10/2015 | Hsu | |
| 9,372,886 B2 | 6/2016 | Feng | |
| 11,115,793 B2* | 9/2021 | Raman | H04W 4/70 |
| 2009/0072024 A1 | 3/2009 | Bonneau, Jr. | G06Q 10/06 |
| | | | 235/380 |
| 2009/0217038 A1 | 8/2009 | Lehtovirta et al. | |
| 2011/0300858 A1* | 12/2011 | Lee | H04W 8/24 |
| | | | 455/425 |
| 2011/0310854 A1* | 12/2011 | Zou | H04W 74/0833 |
| | | | 370/336 |
| 2012/0039253 A1* | 2/2012 | Wang | H04W 72/1263 |
| | | | 370/328 |
| 2012/0142371 A1* | 6/2012 | Park | H04W 60/02 |
| | | | 455/456.1 |
| 2012/0243422 A1 | 9/2012 | Jokimies et al. | |
| 2012/0282956 A1* | 11/2012 | Kim | H04W 4/70 |
| | | | 455/466 |
| 2013/0035067 A1* | 2/2013 | Zhang | H04W 12/06 |
| | | | 455/411 |
| 2013/0044594 A1* | 2/2013 | Kim | H04W 4/70 |
| | | | 370/229 |
| 2013/0051326 A1* | 2/2013 | Jeyatharan | H04L 47/805 |
| | | | 370/328 |
| 2013/0053087 A1 | 2/2013 | Li et al. | |
| 2013/0080597 A1* | 3/2013 | Liao | H04L 5/0001 |
| | | | 709/219 |
| 2013/0089061 A1* | 4/2013 | Lim | H04W 4/70 |
| | | | 370/328 |
| 2013/0201920 A1 | 8/2013 | Takano | |
| 2013/0311640 A1* | 11/2013 | Gleixner | H04L 65/103 |
| | | | 709/224 |
| 2013/0315215 A1* | 11/2013 | Beale | H04W 72/0446 |
| | | | 370/336 |
| 2014/0029515 A1 | 1/2014 | Arkko et al. | |
| 2014/0198677 A1 | 7/2014 | Xu et al. | |
| 2014/0213237 A1 | 7/2014 | Yang et al. | |
| 2014/0307621 A1* | 10/2014 | Frenger | H04W 56/0025 |
| | | | 370/328 |
| 2014/0307685 A1 | 10/2014 | Takano | |
| 2015/0215085 A1 | 7/2015 | Xu et al. | |
| 2015/0256959 A1 | 9/2015 | Jain et al. | |
| 2016/0006815 A1 | 1/2016 | Dong et al. | |
| 2016/0014544 A1 | 1/2016 | Boudreau | |
| 2016/0037514 A1 | 2/2016 | Xiong et al. | |
| 2016/0142308 A1* | 5/2016 | Gage | H04W 4/70 |
| | | | 370/392 |
| 2016/0212567 A1 | 7/2016 | Iwai | |
| 2016/0353493 A1* | 12/2016 | Vrzic | H04W 4/70 |
| 2017/0230951 A1* | 8/2017 | Xiong | H04L 5/0053 |
| 2018/0035327 A1* | 2/2018 | Huang | H04L 12/66 |
| 2018/0041942 A1 | 2/2018 | Raman | |
| 2018/0115879 A1* | 4/2018 | Lindqvist | H04W 52/0245 |
| 2018/0249282 A1* | 8/2018 | McCann | H04W 4/70 |

OTHER PUBLICATIONS

Condoluci et al. "Towards 5G DenseNets: Architectural Advances For Effective Machine-Type Communications over Femtocells" IEEE Jan. 2015 (Year: 2015).*

Condoluci, Massimo et al., "Towards 5G Desnsenets: Architectural Advances for Effective Machine-Type Communications Over Femtocells", IEEE Communications Magazine, vol. 53, No. 1, Jan. 2015, pp. 134-141.

Condulci, Massimo et al., "Towards 5G Desnsenets: Architectural Advances for Effective Machine-Type Communications Over Femtocells", IEEE Communications Magazine, vol. 53, No. 1, Jan. 2015, pp. 134-141.

Tseng, Chi-Wei et al., "A Scheduled Grouping Scheme for MTC Device ID Sharing", IEEE Xplore, Oct. 5, 2015, pp. 1307-1311.

Yue, Gao, "Scalable & Reliable IoT Enabled By Dynamic Spectrum Management for M2M in LTE-A", 2016.

Zheng, Kan et al., "Challenges of Massive Access in Highly-Dense LTE-Advanced Networks with Machine-to-Machine Communications", IEEE Wireless Communications 21(3):12-18 • May 2014, May 2014, 1-16.

* cited by examiner

100

200

600

LTE GATEWAYS FOR HOME AND COMMERCIAL SENSOR DATA

CROSS REFERENCE TO RELATED APPLICATIONS

This application is a continuation of U.S. patent application Ser. No. 15/228,636 filed on Aug. 4, 2016. All sections of the aforementioned application are incorporated herein by reference in their entirety.

FIELD OF THE DISCLOSURE

The subject disclosure relates to network elements for handling sensor data, and more particularly to gateways using long term evolution (LTE) technology for managing data from Internet of Things (IoT) devices in residential and commercial environments.

BACKGROUND

A very wide variety of devices with differing device capabilities may connect to a communication network at various times and for various purposes (for example, a sensor periodically transmitting small amounts of data to a computing device). A network that includes such devices is sometimes referred to as the "Internet of things" (IoT). IoT devices (also referred to herein as machine-type communication or MTC devices) are used in both residential and commercial settings. Residential IoT devices can include smart appliances, smart thermostats, personal/medical monitors, alarm systems, etc. MTC devices are typically small in size, with limited battery power and communication range. MTC devices typically transmit data at lower power and limited bandwidth compared with voice and data traffic generated by mobile communication devices of human users (sometimes referred to as human-type communications or HTC).

BRIEF DESCRIPTION OF THE DRAWINGS

Reference will now be made to the accompanying drawings, which are not necessarily drawn to scale, and wherein.

DETAILED DESCRIPTION

Figure 1:
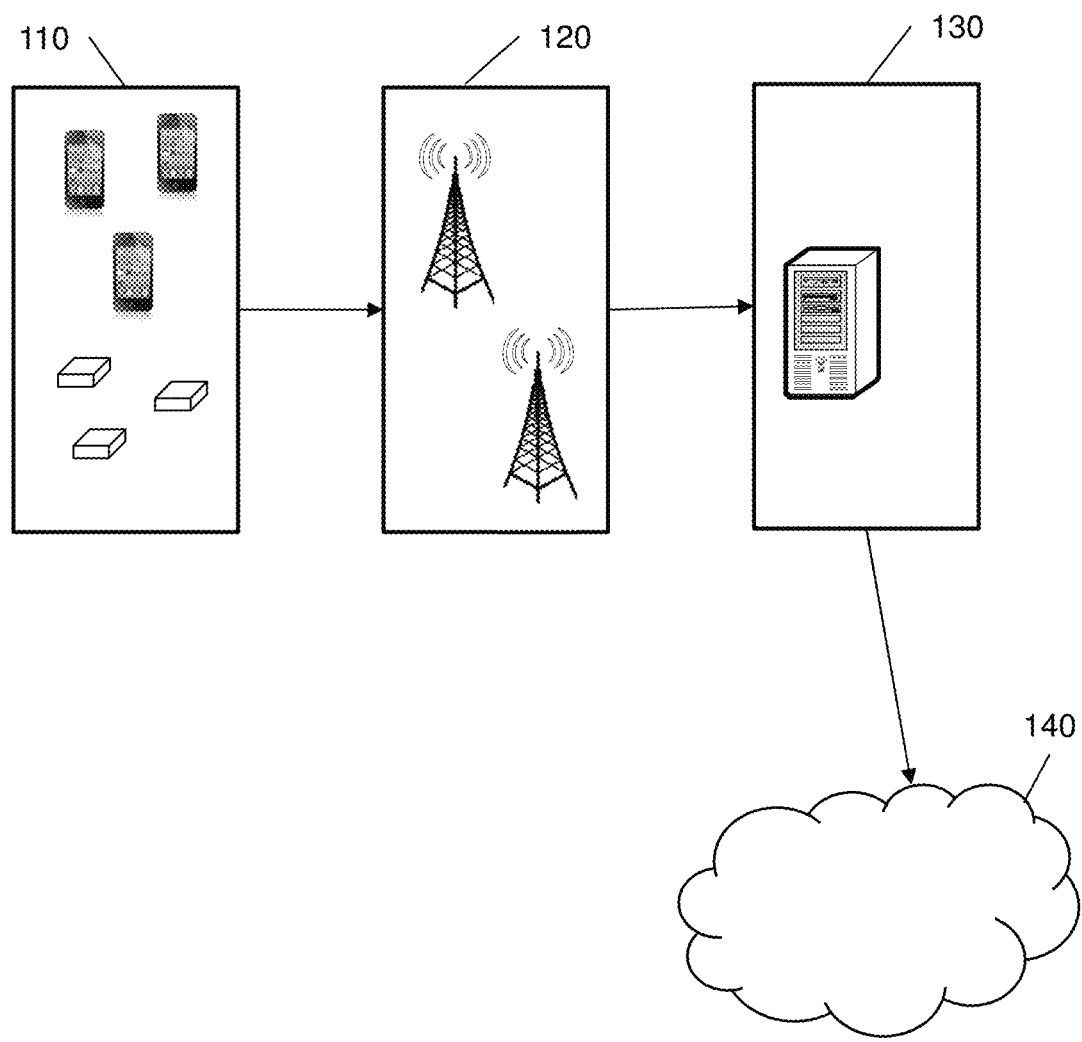
FIG. 1 schematically illustrates device networks and access networks for residential and commercial environments, in accordance with embodiments of the disclosure.

The subject disclosure describes, among other things, illustrative embodiments for a device that facilitates performance of operations, comprising receiving data from a plurality of machine-type communication (MTC) devices located at a premises, where the device is located at the premises; and transmitting the data as a MTC data flow to a network element remote from the premises, where the device does not receive data from user communication devices at the premises generating human traffic communications (HTC), and wherein the network element does not receive HTC. The MTC data accordingly can be transmitted from the premises via a secure, dedicated MTC data path. Other embodiments are described in the subject disclosure.

One or more aspects of the subject disclosure include a device comprising a processing system including a processor, and a memory that stores executable instructions that, when executed by the processing system, facilitate performance of operations. The operations can comprise receiving data from a machine-type communication (MTC) device located at a premises, where the device and a plurality of MTC devices are located at the premises; determining an identifier for the MTC device; comparing the identifier with a list of identifiers accessible to the device; and, responsive to determining that the MTC device is a listed device based on the comparing, transmitting the data to a first network element remote from the premises; the first network element can comprise a femtocell. According to aspects of the disclosure, the device does not receive data from user communication devices at the premises generating human traffic communications (HTC); the first network element does not receive HTC; and the first network element transmits the data to a second network element for aggregation and subsequent transmission to a cloud data facility comprising cloud storage. According to additional aspects of the disclosure, a data path from the device to the first network element, from the first network element to the second network element, and from the second network element to the cloud data facility comprises a secure data path.

One or more aspects of the subject disclosure include a machine-readable storage medium, comprising executable instructions that, when executed by a processing system including a processor, facilitate performance of operations. The operations can comprise receiving data from a machine-type communication (MTC) device located at a premises; the processing system, a plurality of MTC devices, and a plurality of human traffic communication (HTC) devices are located at the premises. The operations can also comprise determining an identifier for the MTC device; comparing the identifier with a list of identifiers coupled to the processing system; and, responsive to determining that the MTC device is a listed device based on the comparing, transmitting the data to a first network element remote from the premises; the first network element can comprise a femtocell. According to aspects of the disclosure, the processing system does not receive data from the HTC devices; the first network element does not receive HTC data; and the first network element transmits the data to a second network element for aggregation and subsequent transmission to a cloud data facility comprising cloud storage. According to additional aspects of the disclosure, a data path from the device to the first network element, from the first network element to the second network element, and from the second network element to the cloud data facility comprises a secure data path.

One or more aspects of the subject disclosure include a method comprising receiving, by a processing system comprising a processor, data from a machine-type communication (MTC) device located at a premises, where the processing system, a plurality of human-type communication (HTC) devices and a plurality of MTC devices are located at the premises. The method can further comprise determining an identifier for the MTC device; comparing the identifier with a list of identifiers accessible to the processing system; and, responsive to determining that the MTC device is a listed device based on the comparing, transmitting the data to a first network element remote from the premises. According to additional aspects of the disclosure, the processing system does not receive data from the HTC devices; the first network element does not receive HTC; and the first network element transmits the data to a second network element for aggregation and subsequent transmission to a cloud data facility comprising cloud storage. According to additional aspects of the disclosure, a data path from the processing system to the first network element, from the first network element to the second network element, and from the second network element to the cloud data facility comprises a secure path dedicated to data from the MTC device.

Aspects of the disclosure relating to a residential environment are discussed below. It will be appreciated that the disclosure can also apply to commercial or government facilities, e.g. nuclear facilities, correctional facilities, stores or other commercial enterprises.

FIG. 1 schematically illustrates a system 100 in accordance with an embodiment of the disclosure, including a device region 110, an access network 120, a core network 130 and the cloud 140. Device region 110 can correspond to all or part of a residence or a commercial building. As shown in FIG. 1, device region 110 can include both MTC devices and HTC devices and communicates with access network 120 using LTE communications.

In an embodiment, data from the MTC devices in a residence is transmitted to the access network separately from the HTC data, and is managed by a separate node of the access network. In this embodiment, data from the MTC devices is transmitted via LTE communications to an evolved UMTS Terrestrial Radio Access Network (E-UTRAN) Node B (eNodeB) that handles residential MTC traffic exclusively. In an embodiment, the eNodeB includes a femtocell. The MTC data is transmitted to a core network 130 having a gateway function for home sensor data; the gateway function causes the data to be stored in a Residential Data Center in the cloud 140.

Figure 2:
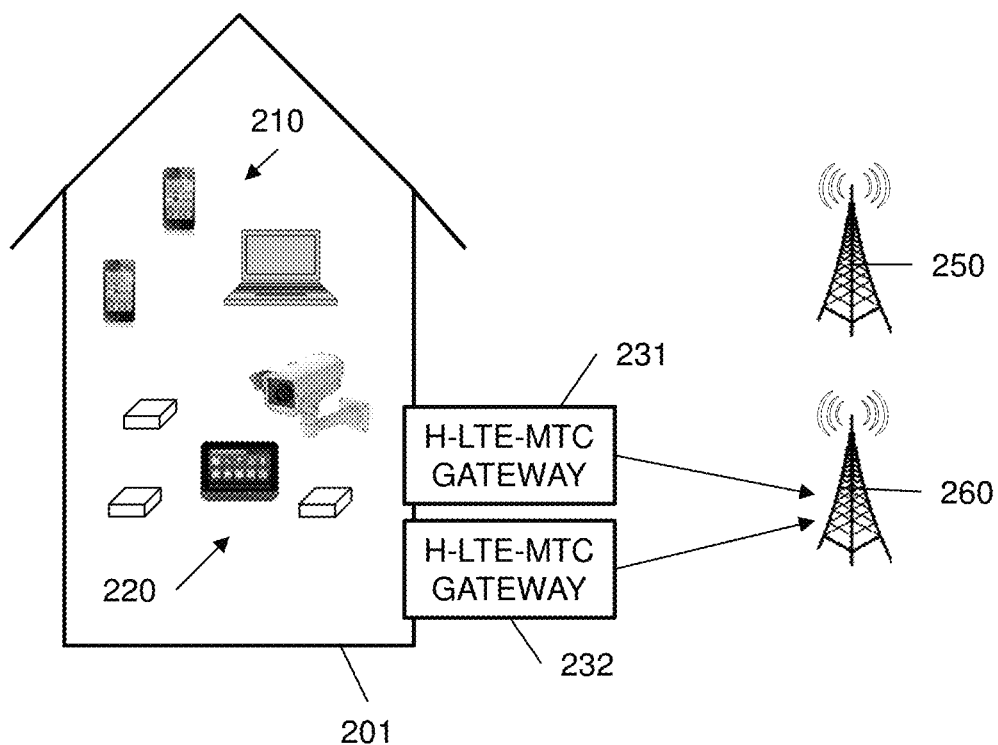
FIG. 2 schematically illustrates HTC and MTC traffic from a residence being managed using LTE technology.

FIG. 2 schematically illustrates an arrangement 200 of residential MTC and HTC devices, in accordance with an embodiment of the disclosure. In this embodiment, residence 201 corresponds to the device domain 110 shown in FIG. 1. A variety of devices are located within residence 201; the HTC devices 210 can include cell phones, tablets, personal computers, etc. for handling data generated by human users, particularly voice data. The MTC devices 220 can include a variety of environmental sensors and other types of sensors, for example temperature/humidity monitors, smoke detectors, motion detectors, cameras, etc.

The access network is shown schematically as base stations respectively corresponding to separate eNBs 250, 260. In this embodiment, the eNB 260 is dedicated to receiving residential MTC traffic, and may be referred to as a Home eNode B (HeNB).

The MTC devices transmit data within the residence using a short-range communication technology (e.g. Bluetooth®) to one or more Home LTE MTC gateways (H-LTE-MTC) dedicated to MTC data. In this embodiment, multiple H-LTE-MTC gateways 231, 232 are used to gather data from the MTC devices, with each of the devices 220 being associated with a particular gateway. Alternatively, both gateways 231, 232 can be configured to communicate with all of the devices 200.

In this embodiment, the H-LTE-MTC gateways are located within the residence and communicate with MTC devices that operate at a prescribed power level (e.g. 100 mW or less) and are located within a prescribed range of the gateway (e.g. 100 m or less).

In an embodiment, the MTC devices transmit data within the residence using a frequency band within, and substantially narrower than, the frequency band used by the HTC devices. In another embodiment, the MTC devices and HTC devices transmit in separate frequency bands.

Figure 3:
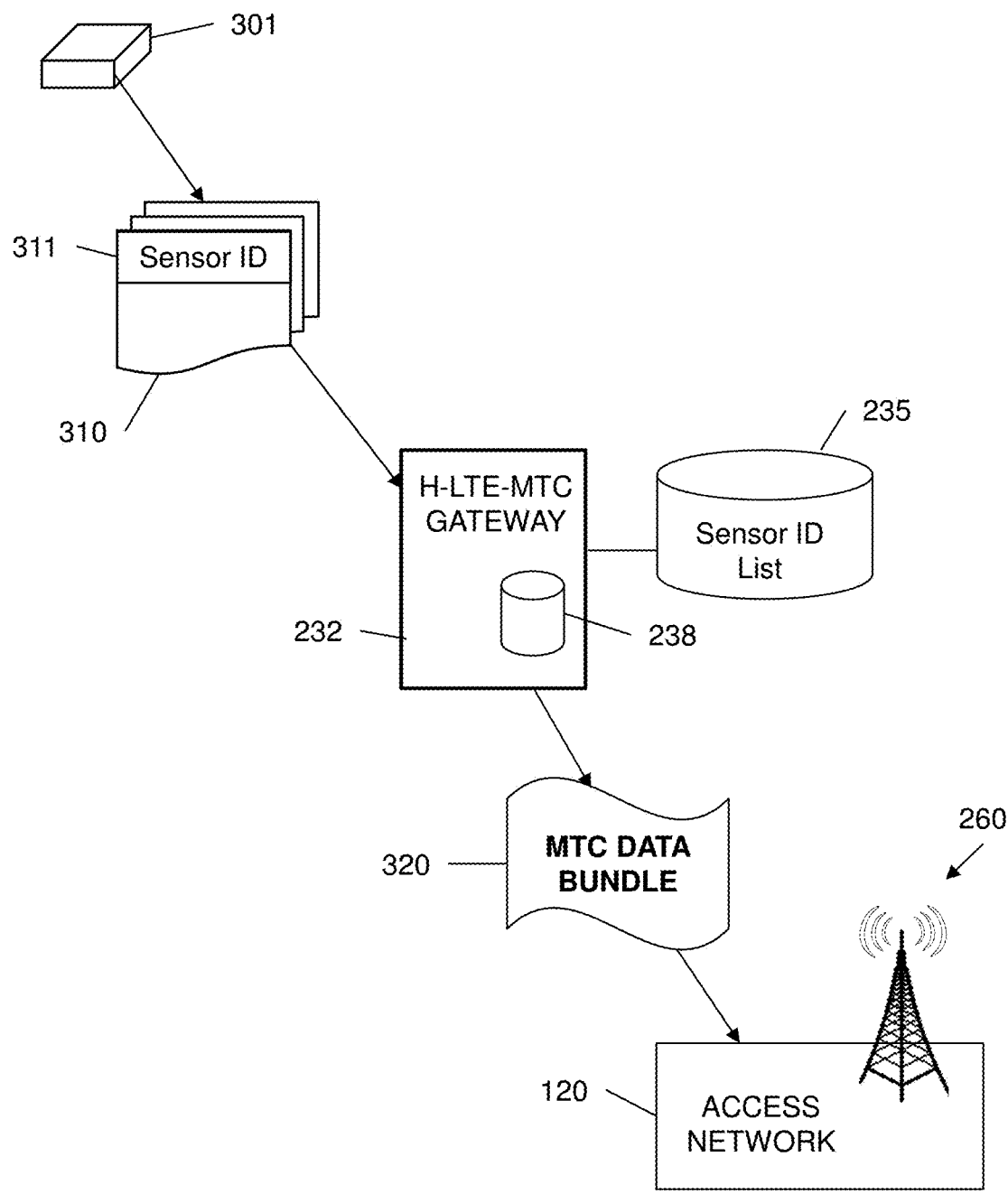
FIG. 3 schematically illustrates MTC sensor data traffic generated in a residential environment and transmitted by an LTE gateway, in accordance with an embodiment of the disclosure.

FIG. 3 schematically illustrates an arrangement 300 of network elements for handling MTC data generated in a residence, in accordance with an embodiment of the disclosure. In this embodiment, sensor device 301 generates data in the form of records 310, each record having a header portion that includes an identifier 311 for the sensor device. Sensor 301 transmits the data via short-range communications to H-LTE-MTC gateway 232. In an embodiment, gateway 232 is maintained in a low-power or inactive state when not receiving data, and transitions to a high-power or active state when incoming data is detected.

Gateway 232 is dedicated to MTC traffic, and accordingly is configured to accept only data generated by the MTC devices in the residence (or a specified portion of those devices). In an embodiment, the gateway determines the identifier 311 of the sending device from an arriving record, and then compares that identifier with a list of MTC devices 235 accessible by the gateway. In particular embodiments, list 235 is maintained on a storage device that is integral with the gateway or that is located in the residence and directly coupled to the gateway.

The list 235 of MTC devices can serve as a registry of MTC devices that are approved for use on the premises. In a commercial environment, this can provide added security since only the approved devices have any access to the LTE network.

In an embodiment, data from the MTC devices is temporarily stored at the gateway in a storage device 238. The data can be retained for a predetermined time period, and then sent as a bundle 320 to the Home eNB 260 on the access network 140. In this embodiment, transmissions from the gateway 232 can be performed on a predetermined schedule. In another embodiment, the stored MTC data can be bundled and transmitted when a predetermined volume of data is reached, so that transmissions (data bursts) from the gateway have a uniform size. In another embodiment, the MTC data is not stored at the gateway 232, so that the MTC data is transmitted as a data flow to the Home eNB.

Figure 4:
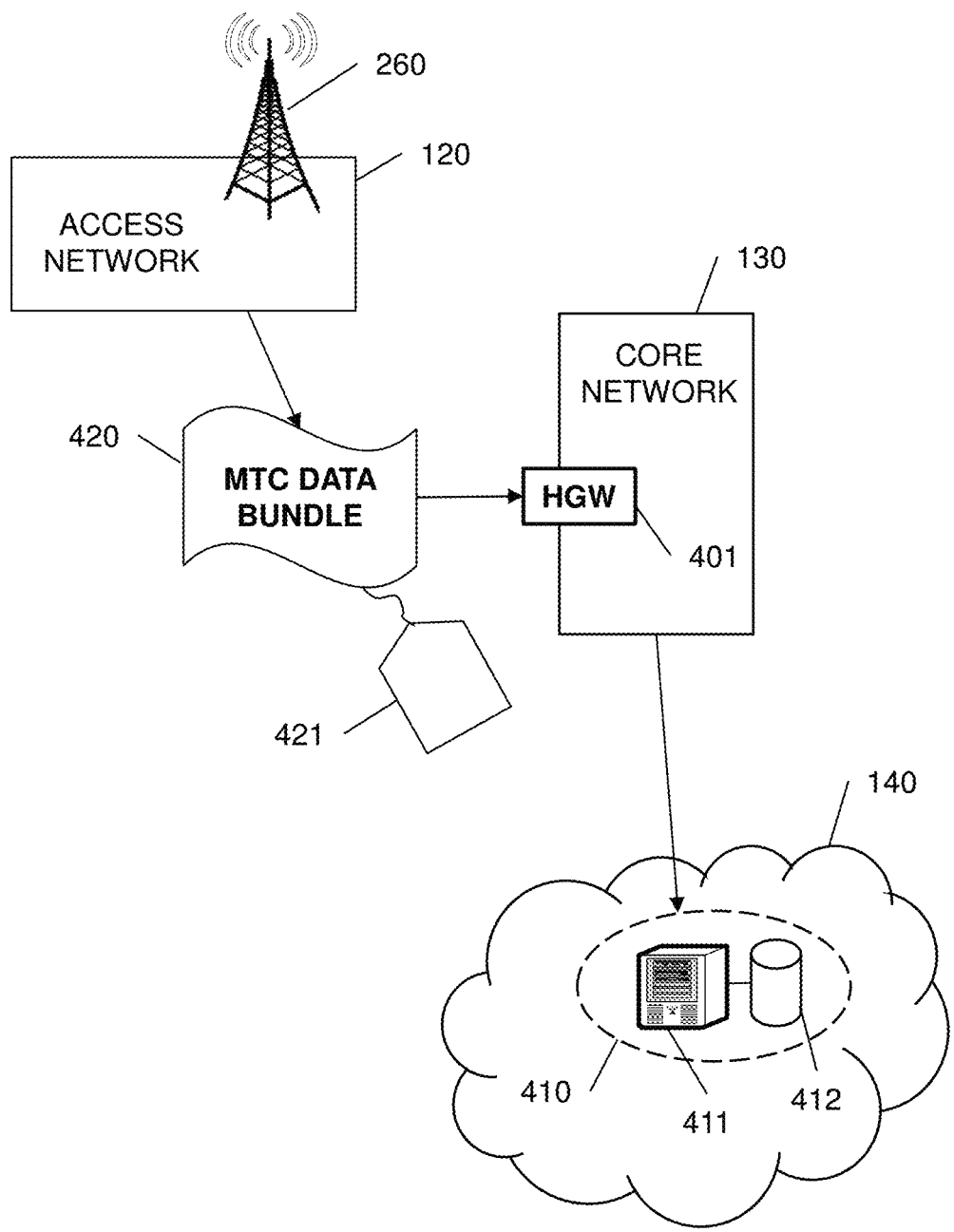
FIG. 4 schematically illustrates a cloud-based home residential data center for storing and monitoring MTC sensor data, in accordance with an embodiment of the disclosure.

FIG. 4 schematically illustrates an embodiment 400 in which MTC data flows from the access network 120 to the core network 130 for storage and management in the cloud 140. In this embodiment, bundles of MTC data 420 are transmitted from the access network 120 to a Home Gateway (HGW) 401 on the core network 130. The HGW 401 can receive MTC data from multiple H-LTE-MTC gateways located at multiple residences.

In this embodiment, the HGW is dedicated to receiving and processing MTC data, and aggregates MTC data transmitted from a number of Home eNB devices on the access network. In a particular embodiment, MTC data from the access network (for example, a data bundle transmitted from Home eNB 260) is provided with a tag 421, enabling the HGW 401 to distinguish MTC data from HTC data.

As shown schematically in FIG. 4, the aggregated MTC data is transmitted to a Home Residential Data Center 410 in the cloud 140. In this embodiment, data center 410 includes a computing device 411 and a storage device 412. The data center can analyze and store the MTC data from a large number of residences. In a particular embodiment, the data center can arrange data generated by a particular type of sensor (e.g. a humidity sensor) from numerous residences into a hierarchy (e.g. a geographical hierarchy), permitting analysis of the data for a given neighborhood, city, metropolitan area, state, region, or country.

In an embodiment, the data path shown in FIGS. 3-4, beginning at MTC device 301, through the H-LTE-MTC gateway 232, Home eNode B 260 and HGW 401, and ending at the data center 410, is a secure data path dedicated to MTC data (that is, separate from HTC data and generated only by recognized and approved devices).

Figure 5:
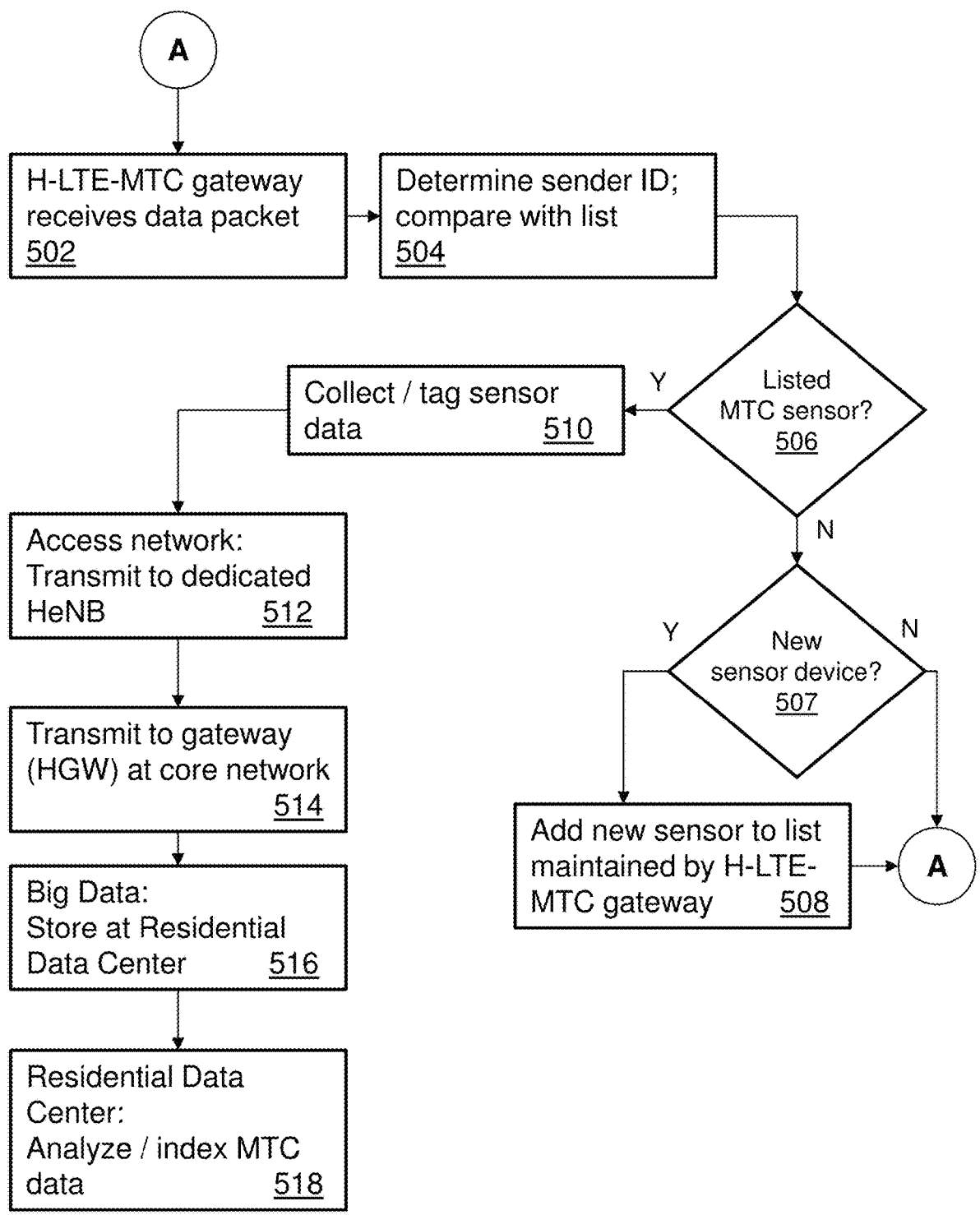
FIG. 5 depicts an illustrative embodiment of a method used in portions of the system described in FIGS. 1-4.

FIG. 5 is a flowchart depicting an illustrative embodiment of a method 500 used in portions of the system described in FIGS. 1-4. In step 502, a data packet generated by a device within residence 201 is received at the H-LTE-MTC gateway. The gateway compares the device identifier on the data packet with the list of MTC source device identifiers (step 504). If the sending device is found on the list (step 506), the gateway collects the data and optionally adds a tag to the data (step 510). If the sending device is not a listed MTC sensor for the residence, the gateway can determine (step 507) whether a new sensor is to be added (step 508). In an embodiment, this can be done by consulting an update log at the gateway containing identifiers for recently installed sensors.

The data collected by the H-LTE-MTC gateway is transmitted to the dedicated Home eNB device on the access network (step 512), and from the access network to the HGW on the core network (step 514). The MTC data is aggregated at the HGW and transmitted to the residential Data Center (step 516). The Data Center (which may be thought of as a "Big Data" configuration) analyzes and indexes the data to make it accessible (step 518).

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It will be appreciated that the collection, transmission and analysis of MTC data can be performed in commercial environments similarly to residential environments. In particular embodiments, a commercial building can have multiple Commercial LTE MTC gateways (C-LTE-MTC gateways) dedicated to specific types of data sensors or specific portions of the building. For example, a commercial facility can include an MTC device including a sensor for detecting a release of a chemical material or nuclear radiation. In further embodiments, commercial MTC data is routed along a secure data path separate from the data path for residential MTC data.

Figure 6:
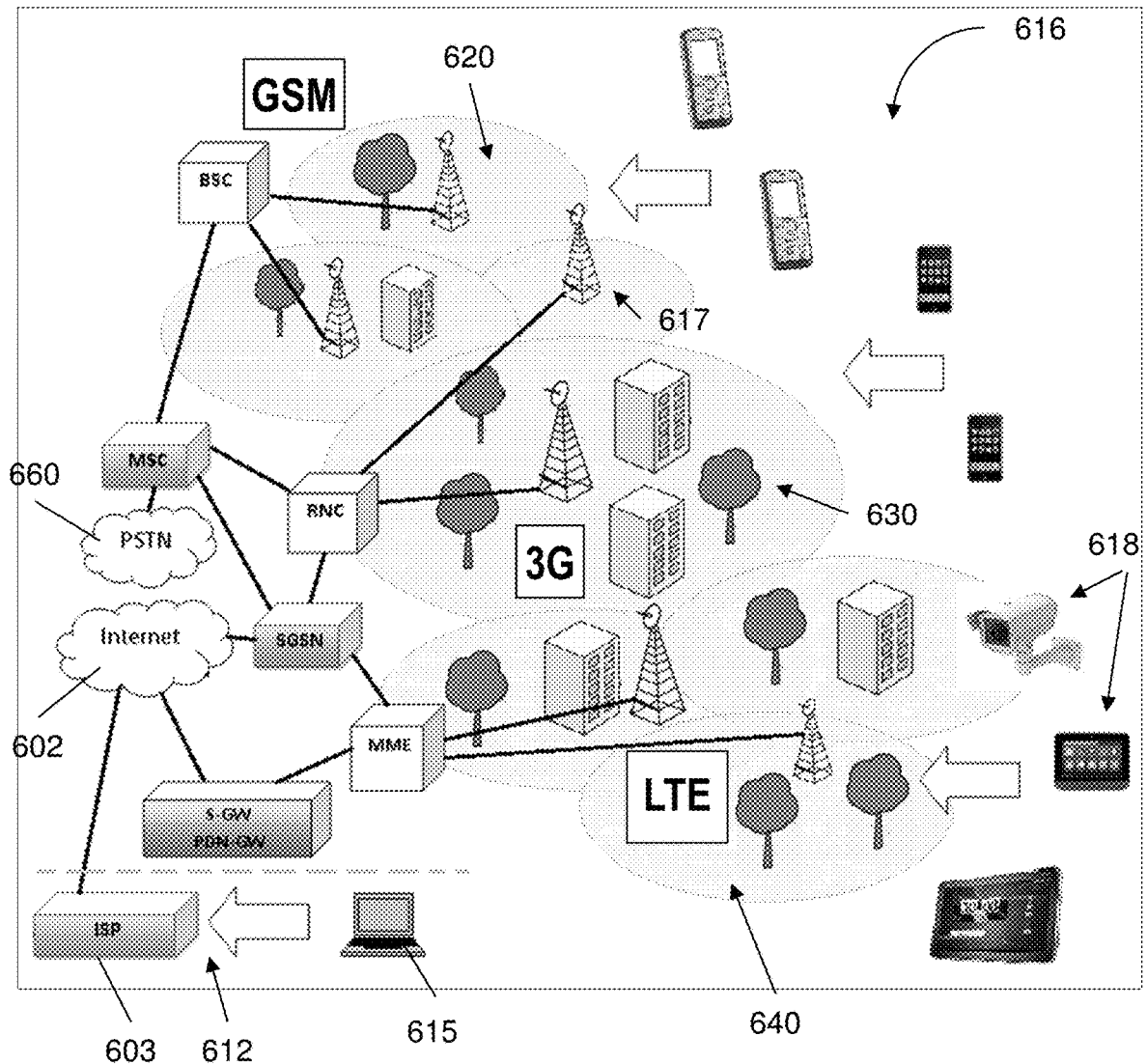
FIGS. 6-7 depict illustrative embodiments of systems that provide communications services to LTE and MTC devices.

FIG. 6 depicts an illustrative embodiment of an architecture 600 for a network for interacting with mobile communication devices and/or IoT devices. According to an embodiment of the disclosure, one or more mobile devices 616 and IoT devices 618 can connect with one or more of the networks shown in FIG. 6. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a Global System for Mobile (GSM) network 620, a 3G network 630, and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616, coupled to a computing device (e.g. a server) of the ISP, can comprise a processing system including a processor, and a memory that stores executable instructions that, when executed by the processing system, facilitate performance of operations. The operations can include receiving data from a machine-type communication (MTC) device located at a premises, where the device and a plurality of MTC devices are located at the premises; determining an identifier for the MTC device; comparing the identifier with a list of identifiers accessible to the device; and, responsive to determining that the MTC device is a listed device based on the comparing, transmitting the data to a first network element remote from the premises; the first network element can comprise a femtocell. In addition, the processing system does not receive data from user communication devices at the premises generating human traffic communications (HTC); the first network element does not receive HTC; and the first network element transmits the data to a second network element for aggregation and subsequent transmission to a cloud data facility comprising cloud storage. Furthermore, a data path from the processing system to the first network element, from the first network element to the second network element, and from the second network element to the cloud data facility can comprise a secure data path.

Figure 7:
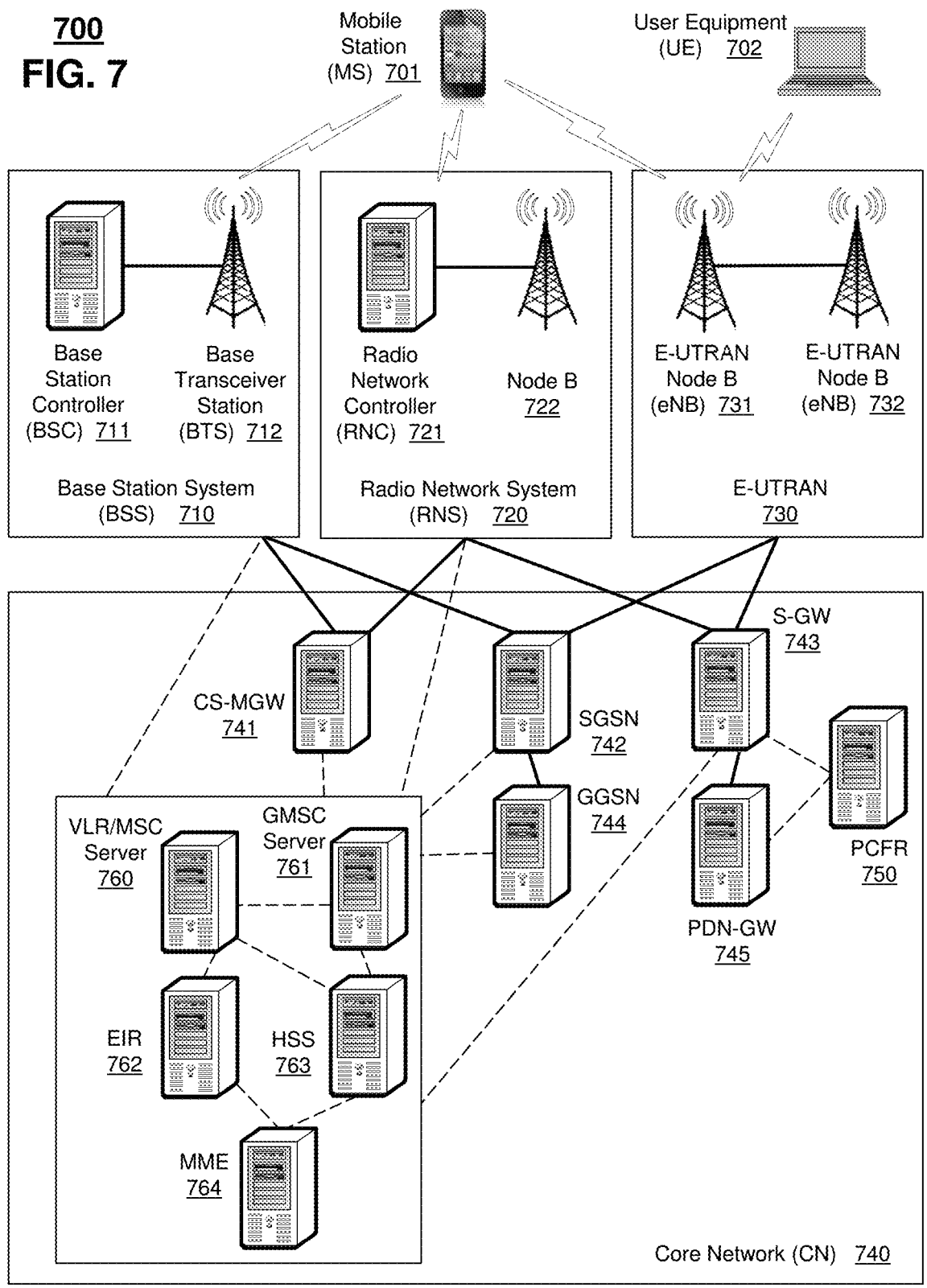

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate with one or more of the systems shown in FIG. 7 using carrier aggregation.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Communication system 700 can be overlaid or operably coupled with system 600. In particular, system 700 can comprise a processing system including a processor that performs a method including receiving, by a processing system comprising a processor, data from a machine-type communication (MTC) device located at a premises, where the processing system, a plurality of human-type communication (HTC) devices and a plurality of MTC devices are located at the premises. The method can further include determining an identifier for the MTC device; comparing the identifier with a list of identifiers accessible to the processing system; and, responsive to determining that the MTC device is a listed device based on the comparing, transmitting the data to a first network element remote from the premises. In addition, when performing the method, the processing system does not receive data from the HTC devices; the first network element does not receive HTC; and the first network element transmits the data to a second network element for aggregation and subsequent transmission to a cloud data facility comprising cloud storage. Furthermore, a data path from the processing system to the first network element, from the first network element to the second network element, and from the second network element to the cloud data facility can include a secure path dedicated to data from the MTC device.

It is further noted that various terms used in the subject disclosure can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 8:
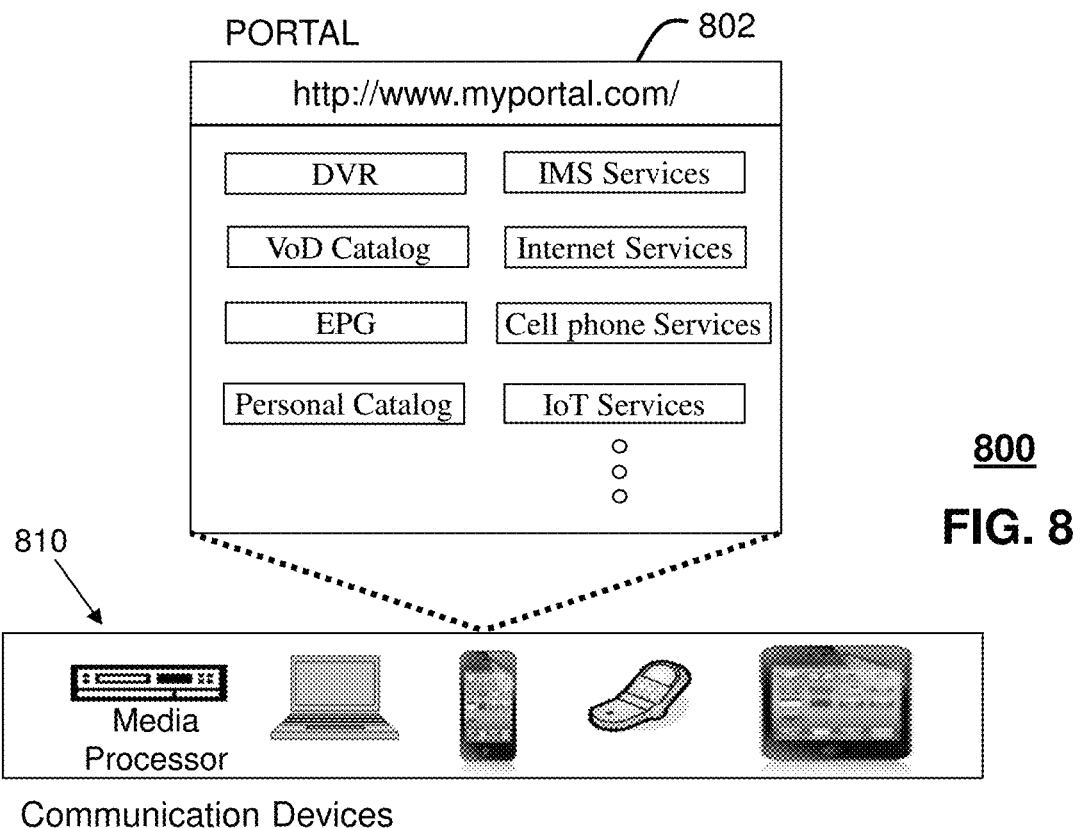
FIG. 8 depicts an illustrative embodiment of a web portal for interacting with the communication systems of FIGS. 6-7.

FIG. 8 depicts an illustrative embodiment of a web portal 802 of a communication system 800. Communication system 800 can be overlaid or operably coupled with the systems of FIGS. 6-7 as another representative embodiment of systems 600-700. The web portal 802 can be used for managing services of communication systems 600-700. A web page of the web portal 802 can be accessed by a Uniform Resource Locator (URL) with an Internet browser using an Internet-capable communication device such as those described in FIGS. 6-8. The web portal 802 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 802 can also be used for provisioning various services on the communication devices 810, for example IMS services, Internet services, cellular phone services, IoT services, and so on. In particular, web portal 802 can be used to access and/or configure IoT devices, and/or perform inventory management of IoT devices.

The web portal 802 can further be utilized to manage and provision software applications and to adapt these applications as may be desired by subscribers and/or service providers of communication systems 600-700. For instance, users of the services provided by servers in systems 600-700 can log into their on-line accounts and provision those servers with information to enable communication with devices described in FIGS. 6-7, and so on. Service providers can log onto an administrator account to provision, monitor and/or maintain the systems 600-700 of FIGS. 6-7.

Figure 9:
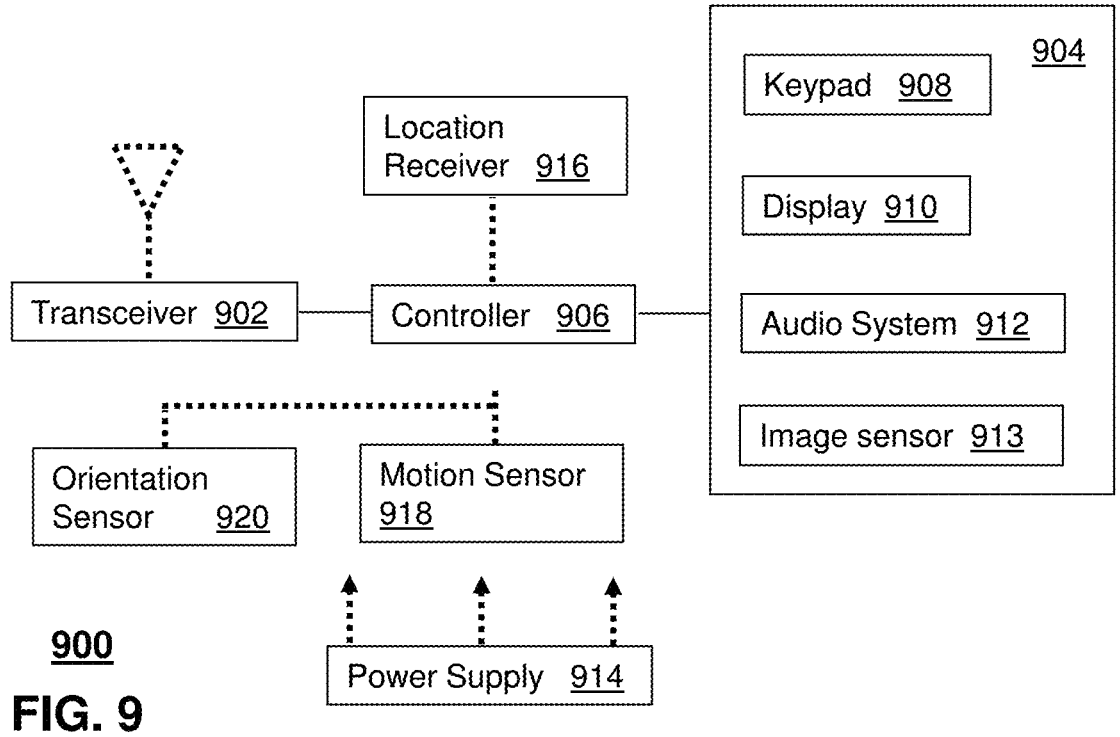
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-4 and can be configured to perform portions of method 500 of FIG. 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or fewer of the circuit components shown in FIG. 9. These variant embodiments can be used in one or more embodiments of the subject disclosure.

The communication device 900 can be adapted to perform the functions of devices of FIGS. 6 and/or 7. It will be appreciated that the communication device 900 can also represent other devices that can operate in systems of FIGS. 1-4.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
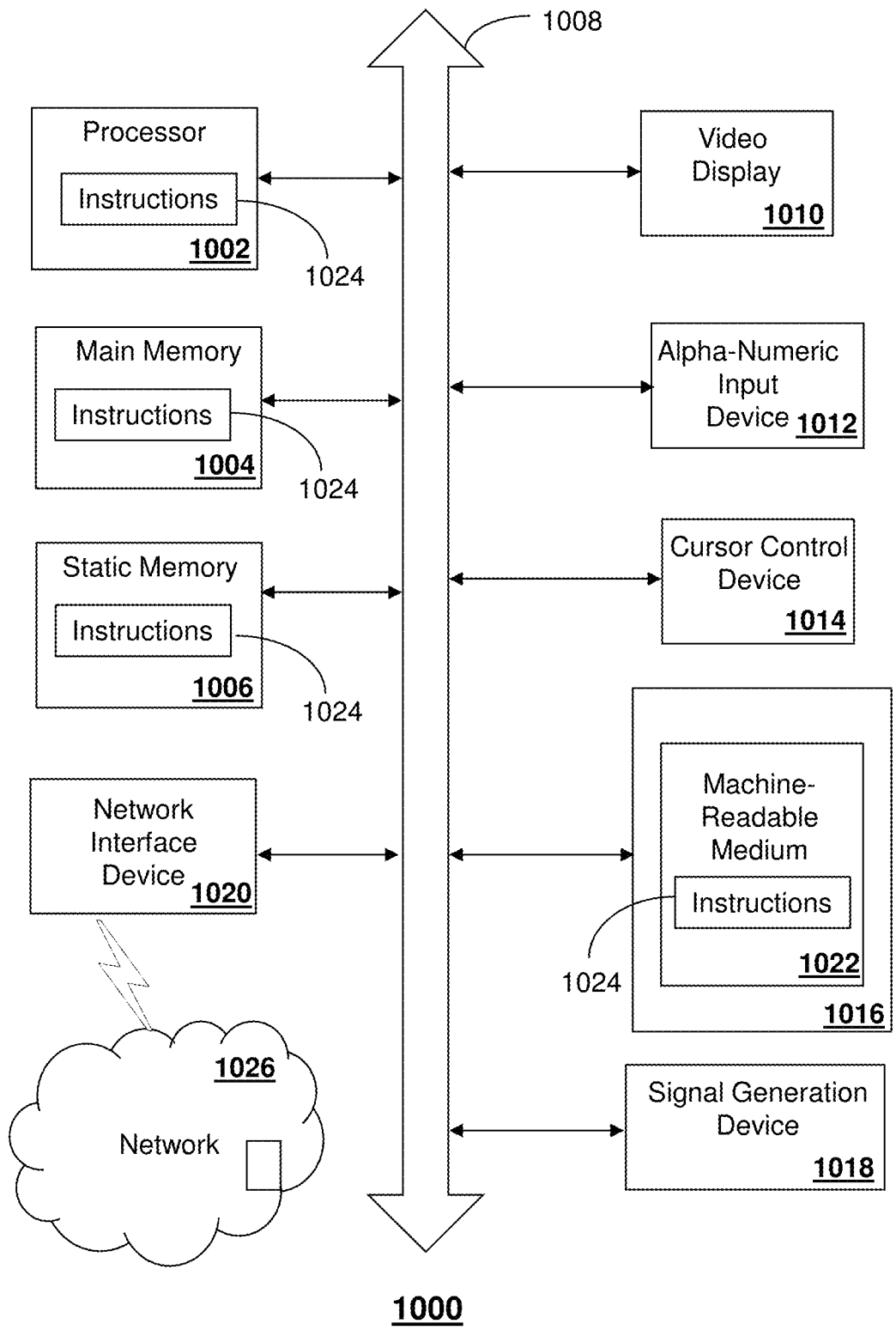
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the H-LTE-MTC gateway, the C-LTE-MTC gateway, and other devices of FIGS. 1-4. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway comprising:
 a processing system including a processor;
 a memory that stores executable instructions that, when executed by the processing system, facilitate performance of operations, comprising:
 receiving, by the gateway, data from a machine-type communication (MTC) device;
 storing the data at the gateway with second data previously stored at the gateway, resulting in a bundle of data; and
 transmitting the bundle of data from the gateway to a first network element for provisioning to a cloud data facility comprising cloud storage, wherein the first network element compares a device identifier on the data to a list of MTC source device identifiers, and wherein the first network element applies a tag to the bundle of data to distinguish the bundle of data as a bundle of MTC data from another bundle of data that is a bundle of human-type communications (HTC) data based on the device identifier on the data being found in the list,
 wherein the cloud data facility arranges the data with third data of a second bundle of data based on the data and the third data corresponding to respective instances of a first type of sensor,
 wherein the cloud data facility arranges the second data with fourth data of the second bundle of data based on the second data and the fourth data corresponding to respective instances of a second type of sensor that is different from the first type of sensor,
 wherein the list is a registry of MTC devices that are approved for use at a premises that comprise a residence, and
 wherein the list is maintained on a storage device that is located in the residence.

2. The gateway of claim 1, wherein the data is received from the MTC device according to a predetermined schedule.

3. The gateway of claim 1, wherein the MTC device comprises an environmental sensor.

4. The gateway of claim 1, wherein the gateway and the MTC device are each located at the premises.

5. The gateway of claim 1, wherein the MTC device transmits data within the residence at a power level less than 100 mW.

6. A non-transitory machine-readable storage medium, comprising executable instructions that, when executed by a processing system including a processor, facilitate performance of operations, comprising:
 receiving, by the processing system, data from a machine-type communication (MTC) device located at premises that comprise a residence, wherein the processing system, a plurality of MTC devices, and a plurality of human traffic communication (HTC) devices are located at the premises;
 storing the data at the processing system; and
 transmitting the data with second data as a bundle to a network element of an access network for provisioning to a cloud data facility comprising cloud storage, wherein the network element compares a device identifier on the data to a list of MTC source device identifiers, and wherein the network element applies a tag to the bundle to distinguish the bundle as a bundle of MTC data from another bundle that is a bundle of HTC data based on the device identifier on the data being found in the list,
 wherein the cloud data facility arranges the data with third data of a second bundle based on the data and the third data corresponding to respective instances of a first type of sensor, wherein the cloud data facility arranges the second data with fourth data of the second bundle based on the second data and the fourth data corresponding to respective instances of a second type of sensor that is different from the first type of sensor, wherein the list is a registry of MTC devices that are approved for use at the premises, and wherein the list is maintained on a storage device that is located in the residence.

7. The non-transitory machine-readable storage medium of claim 6, wherein the MTC device comprises an environmental sensor.

8. The non-transitory machine-readable storage medium of claim 6, wherein the premises comprise a commercial facility, and wherein the MTC device comprises a sensor for detecting a release of a chemical material or nuclear radiation.

9. The non-transitory machine-readable storage medium of claim 6, wherein the MTC device transmits data within the premises at a power level less than 100 mW.

10. A method comprising:

receiving, by a processing system comprising a processor, data from a machine-type communication (MTC) device;

storing, by the processing system, the data; and transmitting, by the processing system, the data with second data as a bundle to a first network element for provisioning to a cloud data facility comprising cloud storage, wherein the first network element compares a device identifier on the data to a list of MTC source device identifiers, and wherein the first network element applies a tag to the bundle to distinguish the bundle as a bundle of MTC data relative to another bundle of data that is a bundle of human-type communications (HTC) data based on the device identifier on the data being found in the list, wherein the cloud data facility arranges the data with third data of a second bundle based on the data and the third data corresponding to respective instances of a first type of sensor, wherein the cloud data facility arranges the second data with fourth data based on the second data and the fourth data corresponding to respective instances of a second type of sensor that is different from the first type of sensor, wherein the list is a registry of MTC devices that are approved for use at a premises that comprise a residence, and wherein the list is maintained on a storage device that is located in the residence.

11. The method of claim 10, wherein the fourth data is included in the second bundle.

12. The method of claim 10, wherein the fourth data is included in a third bundle of data.

13. The method of claim 10, wherein the device identifier is received from the MTC device.

14. The method of claim 10, further comprising:

receiving, by the processing system, the second data from a second MTC device;

receiving, by the processing system, fifth data from a third MTC device;

receiving, by the processing system, sixth data from one of the MTC device, the second MTC device, and the third MTC device; and transmitting, by the processing system, the fifth data and the sixth data as a third bundle, wherein the bundle and the third bundle are of a uniform size.

15. The method of claim 10, wherein the processing system comprises a first gateway and a second gateway, wherein the receiving of the data from the MTC device comprises the first gateway receiving the data and the second gateway not receiving the data, the method further comprising:

receiving, by the second gateway, the second data, wherein the first gateway does not receive the second data.

16. The method of claim 10, wherein the cloud data facility obtains fifth data and sixth data corresponding to respective instances of the first type of sensor, wherein the cloud data facility arranges the data, the third data, the fifth data and the sixth data in accordance with a geographical hierarchy based on the data and the third data corresponding to a first geographical area and the fifth data and the sixth data corresponding to a second geographical area.

17. The method of claim 16, wherein the second geographical area is different from the first geographical area.

18. The method of claim 17, wherein the first geographical area corresponds to a first city and the second geographical area corresponds to a second city.

19. The method of claim 10, wherein the transmitting of the data with the second data as the bundle comprises transmitting the data with the second data and fifth data as the bundle, wherein the data is generated by the MTC device as a first record and the fifth data is generated by the MTC device as a second record, and wherein the first record and the second record include the device identifier.

20. The method of claim 19, wherein the processing system is maintained in a low-power or inactive state and transitions to a high-power or active state when detecting the data, and wherein the receiving of the data is based on the detecting of the data.

* * * * *